United States Patent [19]
Lin

[11] Patent Number: 5,475,615
[45] Date of Patent: Dec. 12, 1995

[54] METHOD AND SYSTEM FOR SIZING INTERACTIVE VIDEO DELIVERY SYSTEMS

[75] Inventor: K. David Lin, Boulder, Colo.

[73] Assignee: U S West Advanced Technologies, Inc., Boulder, Colo.

[21] Appl. No.: 173,810

[22] Filed: Dec. 23, 1993

[51] Int. Cl.$^6$ .................................................. H04J 3/16
[52] U.S. Cl. ......................... 364/514 C; 348/13; 348/16; 370/95.2; 455/3.1; 455/4.2
[58] Field of Search ............................... 364/514, 514 A, 364/514 B, 514 C, 514 R; 455/4.1, 4.2, 6.3, 3.1; 348/13, 16; 370/17, 95.1, 95.2

[56] References Cited

U.S. PATENT DOCUMENTS

| | | | |
|---|---|---|---|
| 5,191,410 | 3/1993 | McCalley et al. | 348/13 |
| 5,371,532 | 12/1994 | Gelman et al. | 348/13 |
| 5,374,951 | 12/1994 | Welsh | 455/6.3 X |

FOREIGN PATENT DOCUMENTS

| | | |
|---|---|---|
| 0412335 | 2/1991 | European Pat. Off. . |
| 2246930 | 2/1992 | United Kingdom . |

OTHER PUBLICATIONS

Real-Time CATV Contention Technology and Application Experience, Jun. 6, 1993, Brian J. Zorc, Allen Anderson, 1993 NCTA Technical Papers, pp. 192–200.

Primary Examiner—Ellis B. Ramirez
Assistant Examiner—Edward Pipala
Attorney, Agent, or Firm—Brooks & Kushman

[57] ABSTRACT

A method and system for determining the required number of active video circuits in an interactive video delivery network required to meet the specified blocking probability constraints. By determining peak loading hours as well as the number of system subscribers in a given video delivery network, the user may determine the blocking probability of the interactive video delivery system in accordance with the formula:

$$P_c = 1 - \sum_{n=0}^{C} \pi_p^M(n)$$

This information may thereafter be used to determine the number active video circuits to meet the determined blocking probability.

4 Claims, 4 Drawing Sheets

METHOD AND SYSTEM FOR SIZING INTERACTIVE VIDEO DELIVERY SYSTEMS

TECHNICAL FIELD

The present invention relates generally to interactive video networks and, more particularly, to a method and system for sizing interactive video delivery systems in accordance with selected blocking probabilities.

BACKGROUND OF THE INVENTION

Since the divestiture of the American Telephone and Telegraph Company in 1984, the Regional Bell Holding Companies (RBHCs) have focused their efforts on cutting operating costs, upgrading their networks, providing new high speed services, and interconnecting their networks to long-distance companies and international carriers. One of the new services under review for offering by the RBHCs is Video-On-Demand (VOD) service. VOD service permits customers to order from a defined library of movies and other programs at any time— thus "on-demand" availability.

In order to provide a sufficient number of video circuits to meet expected demand, network designers have typically relied upon existing methodology and, in particular, the Erlang-B method for predicting the required network size for a certain quality of service for blocking, i.e., the probability that subscriber demand will exceed available circuits. The Erlang-B method has historically been used for sizing telephony networks and is based on an M/M/C/C queuing system. In particular, given C circuits in the networks, the blocking probability, $P_c^{Erlang}$, is given by:

$$P_c^{Erlang} = \frac{(c\rho)^c/c!}{\sum_{i=0}^{c} (c\rho)^i/i!}$$

where $$\rho = \frac{\lambda \cdot \beta}{c}$$

$\lambda$ is the average arrival rate, and $\beta$ is the average holding time.

As those skilled in the art will recognize, the Erlang-B method assumes poisson arrivals (M) and exponential service time distribution (M), i.e., the holding time of telephone calls being exponentially distributed. These assumptions, however, have been found not to be valid in video delivery networks where call holding time is generally constant and relatively long. Because of the special computational methods required to determine the factorials of large numbers— as required by the Erlang-B method—the method has similarly been found to be exceedingly difficult and time consuming to implement in practice. For these reasons, network designers have turned their attention toward the development of alternative methods and systems for sizing interactive video delivery systems which are accurate and easy to implement.

DISCLOSURE OF THE INVENTION

In an effort to overcome the limitations of the prior art implementation of the Erlang-B method, Applicants have observed the following distinctions between video delivery networks and telephony networks: (1) call holding time in a video delivery network is generally more or less constant (approximately 100 minutes), and is relatively long; and (2) the network capacity in video delivery networks required during peak hours must meet the movie requests within approximately 100 minutes prior to these peaks. In other words, any movie requests that come in prior to the selected window will contribute to peak loading. Based on these observations, Applicants have developed the method and system of the present invention for sizing video delivery networks.

It is thus a principal object of the present invention to provide a method and system for sizing interactive video delivery systems in accordance with selected blocking probabilities.

A more specific object of the present invention is the provision of a method and system for determining the required number of active video circuits in an interactive video delivery network required to meet specified blocking probability constraints.

Yet a more specific object of the present invention is the provision of a method and system for determining the required number of active video circuits in an interactive video delivery network required to meet specified blocking probability constraints in accordance with the network blocking probability formula:

$$P_c = 1 - \sum_{n=0}^{c} \pi_p^M(n)$$

where

M=the number of subscribers in the system;

P=the probability that a subscriber will request a movie during a selected time window prior to peak loading;

c=the number of circuits available in the video delivery network;

n=the number of movies simultaneously playing at peak; and $\pi_p^M(n)$=the probability that there are n movies simultaneously playing when there are M subscribers and each with probability p will request a movie during the window prior to peak.

In carrying out the above objects, the method of the present invention is directed for use in cooperation with a computer having memory. By determining peak loading hours as well as the number of systems subscribers in the video delivery network, the user may determine the blocking probability of the interactive video system in accordance with the above referenced formula. Once the blocking probability has been determined, a corresponding first electrical signal may thereafter be generated corresponding to this determined blocking probability. This information may thereafter be converted to digital format and stored in the computer memory. Once stored in digital format, the information may thereafter be retrieved and used to determine the required number of active video circuits required to meet specified blocking probability constraints. A second electrical signal may thereafter be generated. Again, this information may be converted to digital format and stored in computer memory where it may later be retrieved and displayed on a user friendly interface.

Further keeping with the invention, the system of the present invention for sizing interactive video delivery systems is similarly designed for use in cooperation with a computer having memory. The system comprises means for determining peak loading hours as well as means for determining the number of system subscribers in the video delivery network. There is further provided means for determining the blocking probability of the system in accordance with the same formula referenced above. Also keeping with the invention, there is provided means for generating a first electrical signal corresponding to said blocking probability information as well as means for converting this information to digital format, storing it in memory, retrieving it and determining the required number of active video circuits to meet selected probability constraints. Finally, there is provided means for retrieving this information from memory and displaying the same on a user friendly interface.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
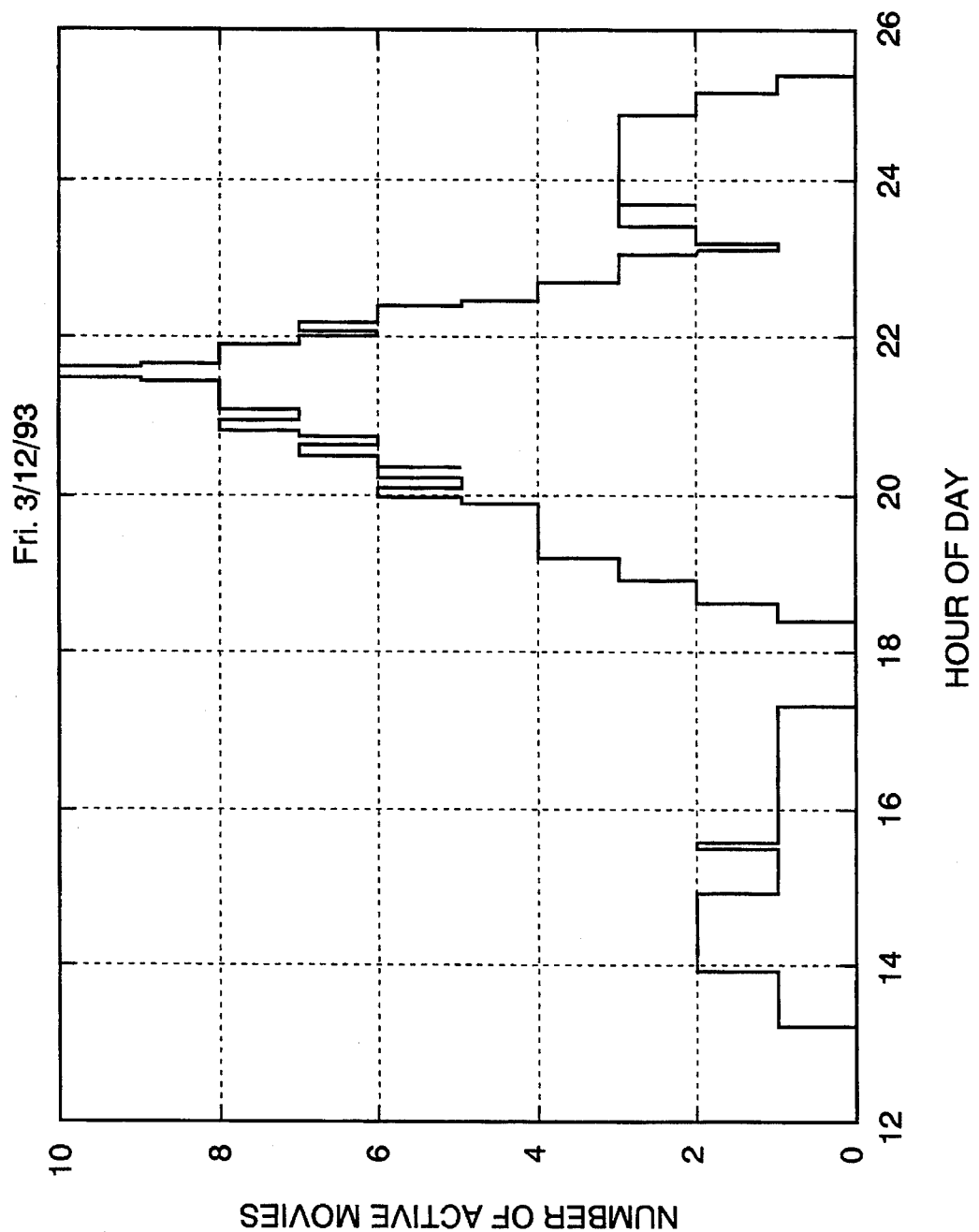
FIGS. 1–2 are schematic diagrams of sample peak hour performance in a sample video on demand system.
Figure 2:
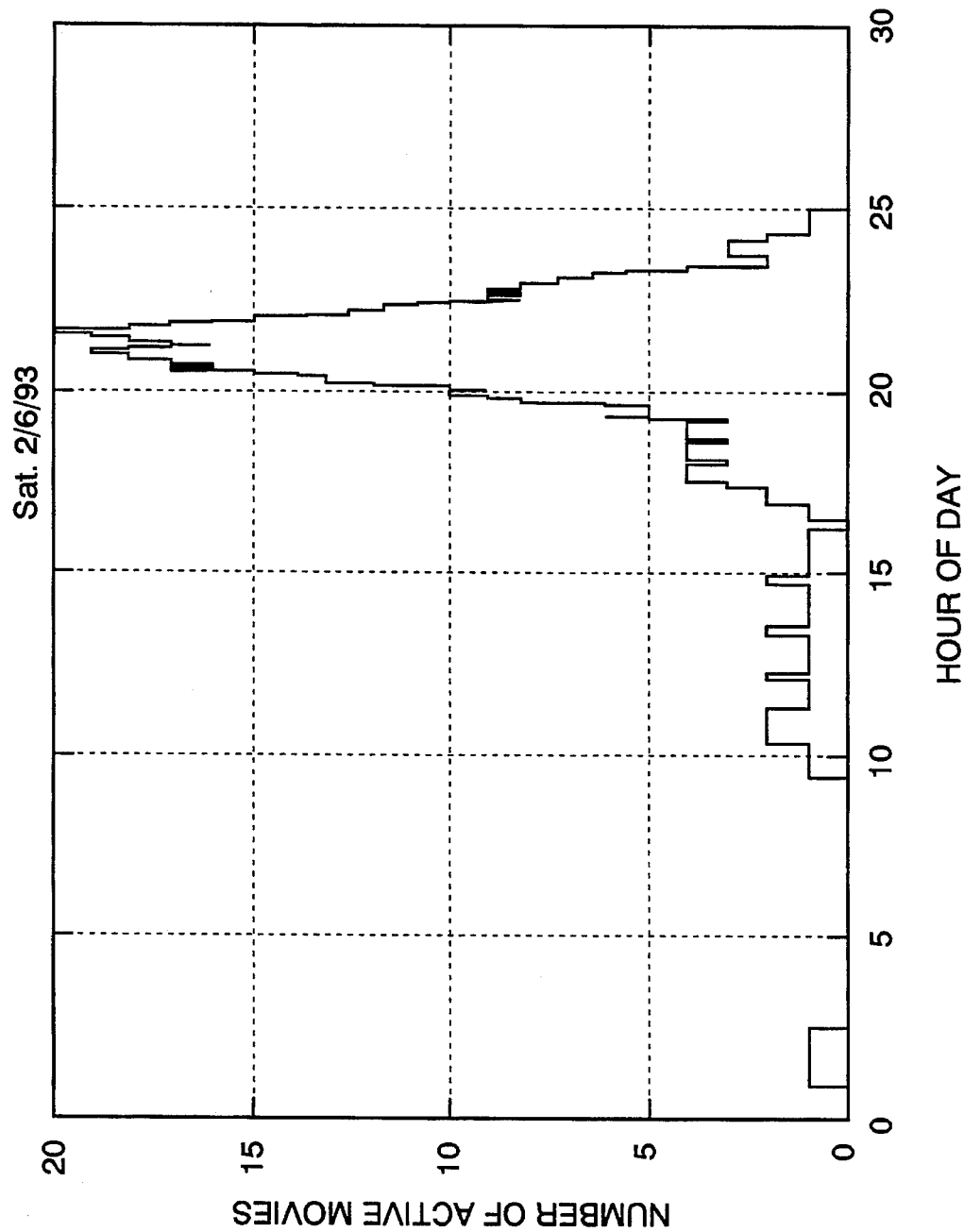

With reference to FIGS. 1–2 of the drawings, there is shown samples of constructed peak hour system performance for a representative Video-On-Demand (VOD) interactive video delivery system. As those skilled in the art will recognize, it is a classical traffic engineering problem to define peak loading hours for a given system. Peak loading hours as used with reference to the present invention is thus defined as the time instant when a number of concurrently used channels or circuits reach maximum values on a daily basis.

As referenced above, Applicants have made two observations in studying video delivery networks: (1) call holding times are more or less constant and are relatively long (approximately 100 minutes); and (2) any movie requests that arrive during the 100-minutes prior to the time of peak demand will contribute to the system peak loading.

Significantly, this is different from traditional telephone networks wherein call holding times vary widely. In such networks, it is well known, for example, that some callers end their calls quickly, while others talk for hours. In the present invention, Applicants address a very different and distinct traffic loading scenario which requires a new methodology and system for sizing applicable networks.

As shown in the schematics of FIGS. 1 and 2, and as should come as no surprise, peak loading in these selected samples taken from a defined Denver sample area occurred on Friday and Saturday evenings. Following a determination of these peak loading hours, as well as the determination of the number of system subscribers in a given video delivery network, the blocking probability of the system may be determined in accordance with the present invention utilizing the following notation:

$$\pi_p^M(n)$$

As those skilled in the art will appreciate, it can be shown that $$\pi_p^M(n)$$

may be written explicitly as follows:

$$\pi_p^M(n) = \binom{M}{n} p^n (1-p)^{M-n}$$

$$= \frac{M!}{n!(M-n)!} p^n (1-p)^{M-n}$$

Let C be the number of circuits available in the video delivery network, and $P_C$ is the blocking probability of the network. $P_C$ is thus given by:

$$P_c = \sum_{n=c+1}^{M} \pi_p^M(n)$$

$$P_c = 1 - \sum_{n=0}^{c} \pi_p^M(n)$$

As those skilled in the art will further recognize, this equation lends itself to nice arithmetic properties which may be calculated for large values of M and N. For example, to obtain the value for each $$\pi_P^M(n),$$

N equals 0, 1, 2, . . . C where C is the number of circuits available in the system, it is necessary to calculate the factorials of large numbers. This is now a feasible task. Thus, in accordance with the invention herein, from the equation above, the natural logarithm of both sides may be taken to simplify the equation as shown below:

$$\pi_p^M(n) = \frac{M!}{n!(M-n)!} P^n (1-P)^{M-n}$$

$$\log \pi_p^M(n) = \log \frac{M!}{n!(M-n)!} + n\log p + (M-n)\log(1-P)$$

$$\log \pi_p^M(n) = \sum_{i=0}^{M-(n+1)} \log(M-i) - \sum_{i=1}^{M-n} \log i + n\log P + (M-n)\log(1-P)$$

$$\text{Let } A = \sum_{i=0}^{M-(n+1)} \log(M-i) - \sum_{i=1}^{M-n} \log i + n\log P + (M-n)\log(1-P)$$

$$\therefore \pi_p^M(n) = e^A$$

Against this background, the computation of A is straight forward, and thus does not require special numerical procedures.

Operation

Figure 3:
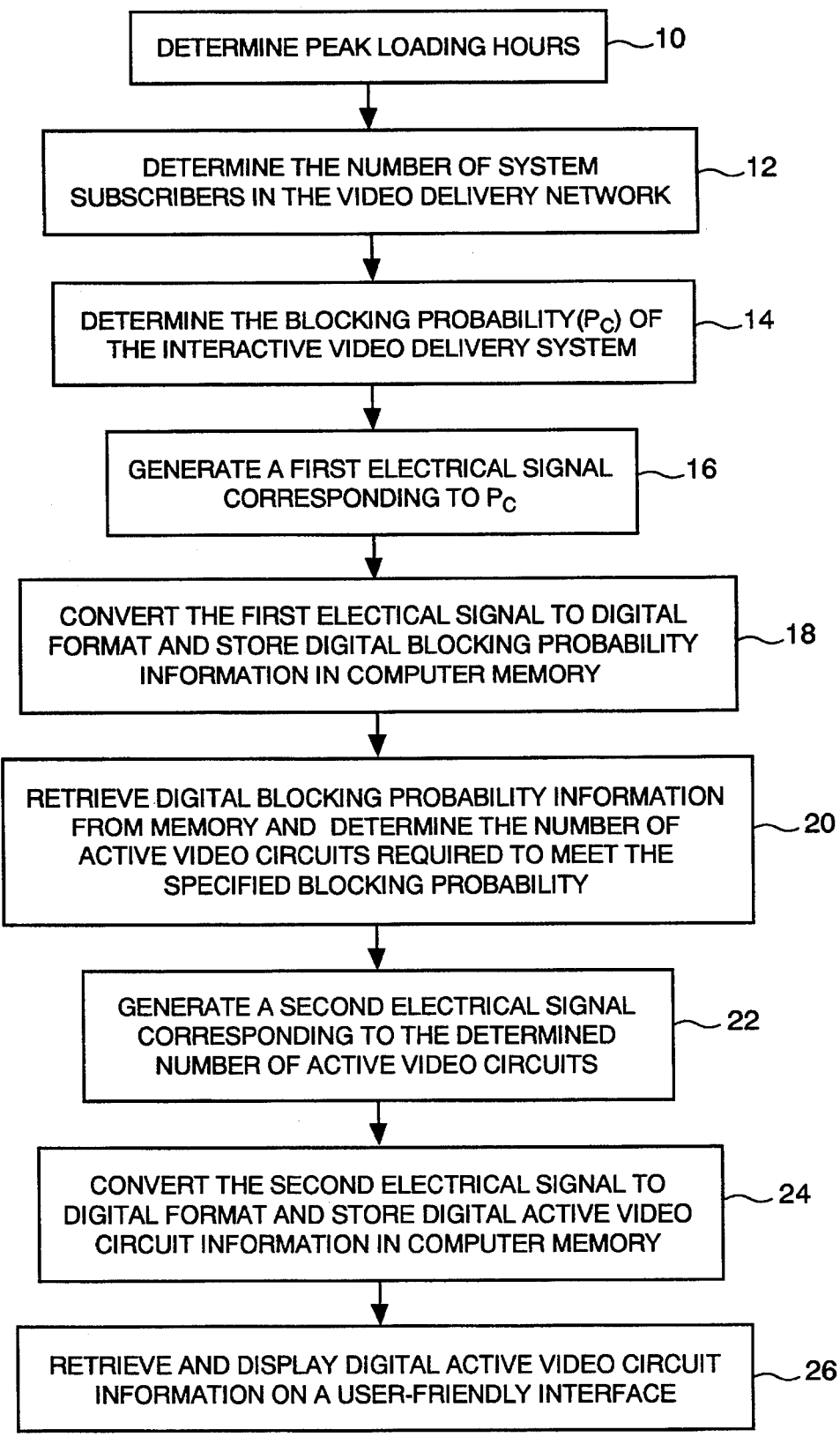
FIG. 3 is a block diagram of the method steps of the present invention.

With specific reference now to FIG. 3 of the drawings, the method of the present invention will now be described in further detail. As referenced above, the method and system for sizing interactive video delivery systems of the present invention is adapted for use in cooperation with a computer having memory. At the outset, the invention requires the determination of peak loading hours (10) as well as the determination of the number of system subscribers (12) in the video delivery network under review. Of course, these determinations may be made manually. However, in the preferred embodiment, it is anticipated that background information regarding loading hours and system subscribers will be stored within an appropriate computer memory which may be accessed through initiation of conventional programming procedures to determine peak loading hours and the number of system subscribers in a given network sought to be reviewed. Against this background, the blocking probability of the system may thereafter be determined in accordance with the formula:

$$P_c = 1 - \sum_{n=0}^{C} \pi_p^M(n)$$

where:

M equals the number of said system subscribers, n equals the number of movies simultaneously playing at said peak loading hours, p equals the probability that a subscriber will request a movie during a selected time window prior to said peak loading hours, and C equals the number of circuits available in said video delivery network.

Again, while the blocking probability may be determined manually, in the preferred embodiment, it is anticipated that the blocking probability $P_C$ may be determined through simple programming procedures wherein information regarding the number of system subscribers, the number of movies simultaneously playing at peak loading hours, the probability that a subscriber will request a movie during a selected time window prior to peak loading hours and a number of circuits available in the video delivery network is stored in an appropriate computer memory which may be accessed.

Once the blocking probability ($P_C$) has been determined, a first electrical signal corresponding thereto may thereafter be generated, preferably by the computer system on which the above steps have been carried out, converted to digital format in accordance with conventional procedures and stored in computer memory as shown in blocks (16) and (18). Thereafter, this digital blocking probability information may be internally retrieved by the computer system from its associated memory and analyzed so as to determine the number of active video circuits required to meet the specified blocking probability, as shown in block (20). Again, once the number of active video circuits has been determined, a second electrical signal corresponding thereto may be generated as shown in block (22). As in the case of the first electrical signal, in the preferred embodiment, this second electrical signal may be generated by the computer system and thereafter be converted to digital format such that active video circuit information may be stored in computer memory as shown in block (24). Finally, this digital active video circuit information may be internally retrieved by the computer from its associated memory and displayed for the user's review on a user-friendly interface such as a computer monitor or the like as shown in block (26).

Output

Figure 4:
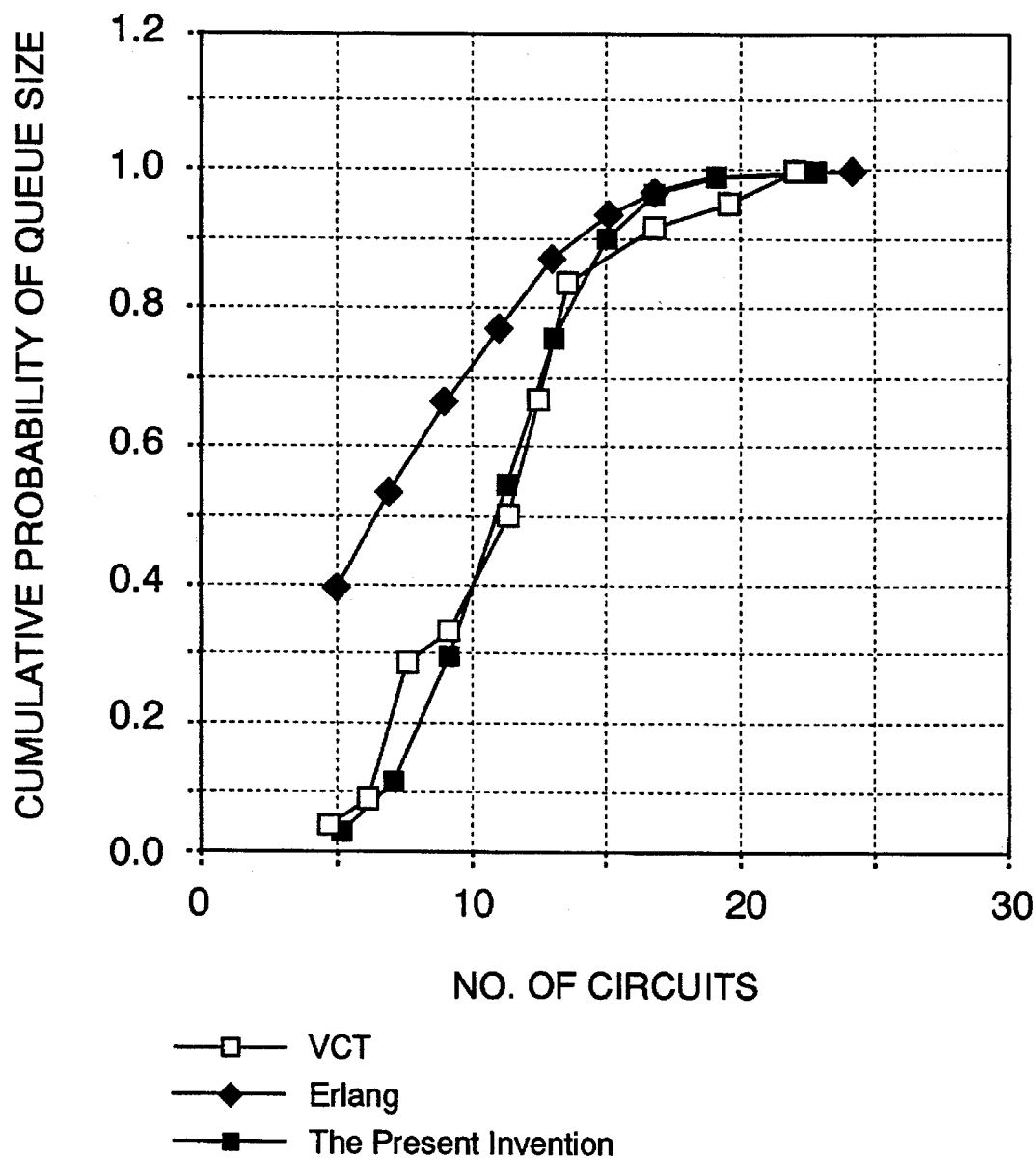
FIG. 4 is a graphical representation comparing sample Viewer-Controlled Cable Television (VCTV) trial data and cumulative probability of queue size using the prior art Erlang-B formula and the method and system of the present invention.

Turning now to FIG. 4 of the drawings, the prior art Erlang-B method which has been historically used for sizing telephony networks is used to plot cumulative probability of queue size in a video delivery network in comparison to actual VCTV trials and the method steps of the present invention. As referenced above, the Erlang-B method is based on an M/M/C/C queuing system. Given C circuits in the network, the blocking probability $P_C^{Erlang}$ is given by where $$\rho = \frac{\lambda \cdot \beta}{c}$$

$$P_c^{Erlang} = \frac{(c\rho)^c/c!}{\sum_{i=0}^{c} (c\rho)^i/i!}$$

$\lambda$ is the average arrival rate, and $\beta$ is the average holding time.

As shown in the example of FIG. 4, using VCTV data from Jan. 8, 1993 to Mar. 31, 1993 in a defined Denver sample area, Applicants have obtained the parameters for the Erlang-B method and for the method of the present invention. This information is then used to plot the queue size cumulative distributions along with the actual VCTV data. It should be noted that the queue size cumulative distribution, $P_C$, is defined as $P_{CUM}=1-P_C$.

Significantly, the method used in accordance with the present invention fits the VCTV data very well, while the Erlang-B formula is very different when C is small. Applicants have found that the Erlang-B formula is applicable to a steady-state queuing system, while VCTV results suggest that the video delivery network may not go to steady-state sufficiently fast. It is thus noted that a positive-recurrent queuing system takes time T to go from transient-state to steady-state.

$$T \alpha \frac{1}{1-\rho}$$

where $\rho$ is defined as $$\frac{\lambda \cdot \beta}{C}.$$

For a given loading scenario, i.e., for fixed $\lambda$ and $\beta$ values, the value of $\rho$ increases as the number of circuits (the C value) decreases. Consequently, the system goes from transient-state to steady-state at a slower rate. It is thus observed that a large difference between the Erlang-B method and VCTV results at smaller C values. On the other hand, the method used in accordance with the present invention is not based on steady-state analysis of a positive-recurrent queuing system. It is thus believed that it provides a more accurate prediction of system loading for video delivery networks.

While the method and system of the present invention provides a more accurate prediction of system loading, it should be noted that system performance is further affected by additional factors. For example, marketing decisions may affect the system performance. Consider, for example, the situation wherein a video service offers a promotion to give away free movies on a particular evening. In such a case, the system loading will increase dramatically. On the other hand, during major sporting events such as, for example, the SuperBowl, it is expected that there will be fewer Video-On-Demand viewers.

While the best modes for carrying out the invention have been described in detail, those familiar with the art to which this invention relates will recognize various alternative designs and embodiments for practicing the invention as defined by the following claims.

What is claimed is:

1. For use in cooperation with a computer having memory, a method of placing video circuits in an interactive video delivery system, comprising:

determining peak loading hours;

determining a number of system subscribers in the video delivery system;

determining a blocking probability of the system in accordance with the formula:

$$P_c = 1 - \sum_{n=o}^{C} \pi_p^M(n)$$

where:

M equals the number of system subscribers, n equals a number of movies simultaneously playing at peak loading hours, p equals a probability that a subscriber will request a movie during a selected time window prior to peak loading hours, C equals a number of circuits available in the video delivery system;

storing in the memory of the computer blocking probability data corresponding to the determined blocking probability;

determining from the blocking probability data a number of video circuits required to meet the determined blocking probability; and placing the determined number of video circuits in the interactive video delivery system.

2. The method of claim 1 further comprising:

converting the blocking probability data to graphic data; and displaying the graphic data on a user-friendly interface.

3. For use in cooperation with a computer having memory, a system for placing video circuits in an interactive video delivery system, comprising:

means for determining peak loading hours;

means for determining a number of system subscribers in the video delivery system;

means for determining a blocking probability of the system in accordance with the formula:

$$P_c = 1 - \sum_{n=o}^{C} \pi_p^M(n)$$

where:

M equals the number of system subscribers, n equals a number of movies simultaneously playing at peak loading hours, p equals a probability that a subscriber will request a movie during a selected time window prior to peak loading hours, C equals a number of circuits available in the video delivery system;

means for storing in the memory of the computer blocking probability data corresponding to the determined blocking probability;

means for determining from the blocking probability data a number of said video circuits required to meet the determined blocking probability such that corresponding video circuits may be placed in the interactive video delivery system.

4. The system of claim 3 further comprising:

means for converting the blocking probability data to graphic data; and a user-friendly interface for displaying the graphic data.

\* \* \* \* \*